United States Patent [19]
Krzyzanski

[11] Patent Number: 4,932,091

[45] Date of Patent: Jun. 12, 1990

[54] END CONNECTOR ATTACHMENT TOOL

[75] Inventor: Joseph A. Krzyzanski, New Haven, Conn.

[73] Assignee: Rostra Tool Company, Branford, Conn.

[21] Appl. No.: 398,528

[22] Filed: Aug. 25, 1989

[51] Int. Cl.[5] .......... H02G 1/12

[52] U.S. Cl. .......... 7/107; 30/90.1; 29/758

[58] Field of Search .......... 7/107; 29/747, 748, 29/750, 566.4, 751, 752, 757, 758, 33 M; 30/90.1

[56] References Cited

U.S. PATENT DOCUMENTS 3,205,567 9/1965 Irvine et al. .......... 29/758

3,795,023 3/1974 Miragliotta .......... 7/107

4,805,302 2/1989 Steiner .......... 30/90.1

*Primary Examiner*—Roscoe V. Parker

*Attorney, Agent, or Firm*—John H. Crozier

[57] ABSTRACT

A tool for the attachment of a solderless, compression-fit end connector to the end of a coaxial cable, in which tool the components of the connector and the two-level stripped coaxial cable are positioned and then a manually lever-operated piston within the tool forces the components and the cable together, locking the connector to the cable and providing a sealed chamber in which the braid connection is made. In a preferred embodiment, the connector attachment mechanism is located at one end of the tool and a two-level coaxial cable stripper is located at the other end of the tool.

17 Claims, 2 Drawing Sheets

END CONNECTOR ATTACHMENT TOOL

BACKGROUND OF THE INVENTION

1. Field of the Invention

This invention relates to hand tools for end connector attachment generally and, more particularly, to a novel end connector attachment tool for compression-type coaxial cable connectors, which tool may combine in one tool body the functions of wire stripping and attachment of a solderless, compression-fit end connector for coaxial cable.

2. Background Art

Solder-type end connectors for coaxial cable are well known and typically comprise a two piece arrangement with which the cable is first stripped in two levels: one to expose the shielding braid and the other to expose the center conductor of the cable. One piece of the fitting is slipped over the stripped end and the braid soldered at one position and the center connector soldered at another position. The second piece of the fitting has a female thread for attachment to a male fitting. A substantial limitation of this type of connector is that the solder joints may not be properly made or may later deteriorate because of the environment in which the connector is used. A solderless, compression-fit end connector has been developed, the features of which will be described later. Heretofore, there has been no tool which can quickly and conveniently attached such an end connector to coaxial cable.

Another problem with the attachment of end connectors to coaxial cable is that a technician must use one tool for stripping the coaxial cable, then set that tool aside, and then pick up a different tool, or tools, for end connector attachment. The pliers-type stripping/crimping tools used with single conductor wire are unsuitable both for two-level stripping of coaxial cable and for attaching compression fittings.

Wire strippers are well known devices and one such device is described in U.S. Pat. No. 4,805,302, issued Feb. 21, 1989, and assigned to the assignee of the present invention, the entire disclosure of which is hereby made a part hereof by reference, wherein there is disclosed a circular wire stripper having one or more fixed and/or rotatable circular cutting blades. Other types of wire strippers employ flat cutting blades or employ two opposed V-shaped cutting blades forming a diamond-shaped aperture.

Accordingly, it is a principal object of the present invention to provide a tool for the attachment of compression fittings to the ends of coaxial cable.

Another object of the invention is to provide such a tool that may also be used to provide two-level stripping of coaxial cable.

An additional object of the invention is to provide such a tool which may be simply and economically manufactured.

Other objects of the invention, as well as particular features and advantages thereof, will be elucidated in or apparent from the following description and the accompanying drawing figures.

SUMMARY OF THE INVENTION

The present invention achieves the above objects, among others, by providing, in a preferred embodiment, a tool for the attachment of a solderless, compression-fit end connector to the end of a coaxial cable, in which tool the components of the connector and the two-level stripped coaxial cable are positioned and then a manually lever-operated piston within the tool forces the components and the cable together, locking the connector to the cable and providing a sealed chamber in which the braid connection is made. In a preferred embodiment, the connector attachment mechanism is located at one end of the tool and a two-level coaxial cable stripper is located at the other end of the tool.

DESCRIPTION OF THE PREFERRED EMBODIMENTS

Figure 1:
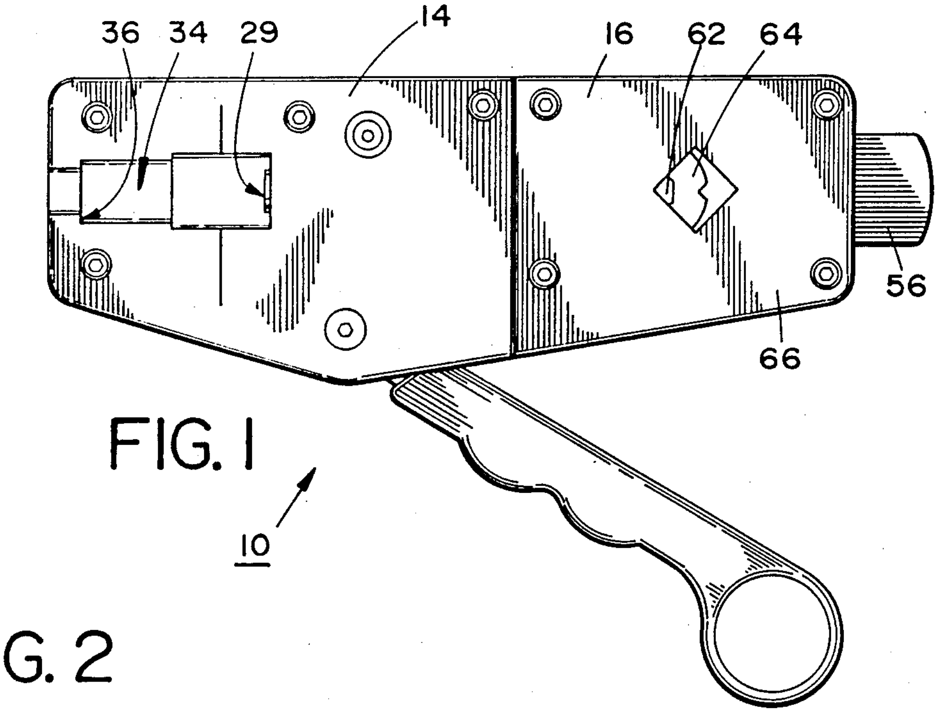
FIG. 1 is a side elevation view of a combination tool having a two-level coaxial cable stripper and solderless, compression-fit end connector tool, assembled and in its nonuse position.
Figure 2:
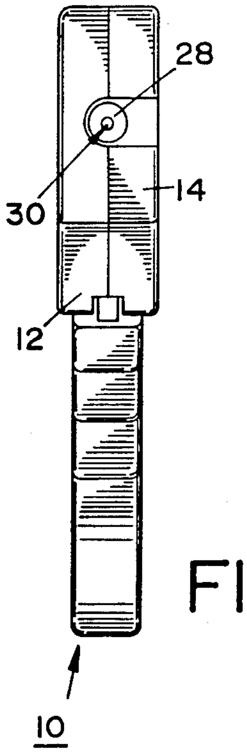
FIG. 2 is a front elevation view of the combination tool of FIG. 1.
Figure 3:
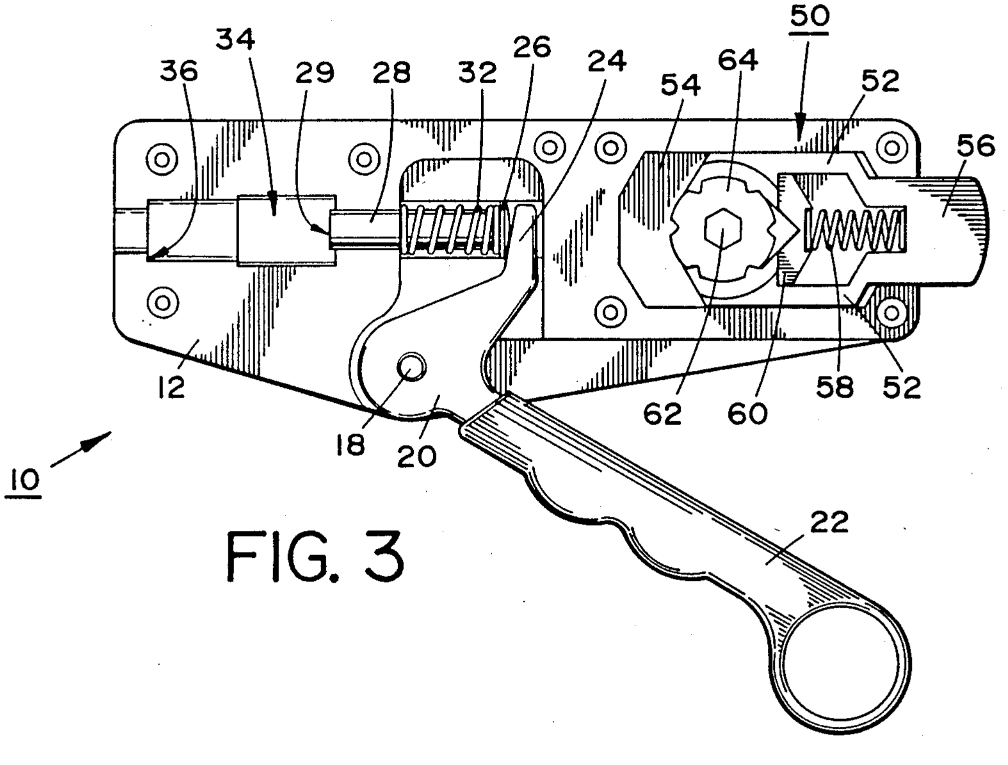
FIG. 3 is a side elevation view of the combination tool of FIG. 1 with the side covers removed.
Figure 4:
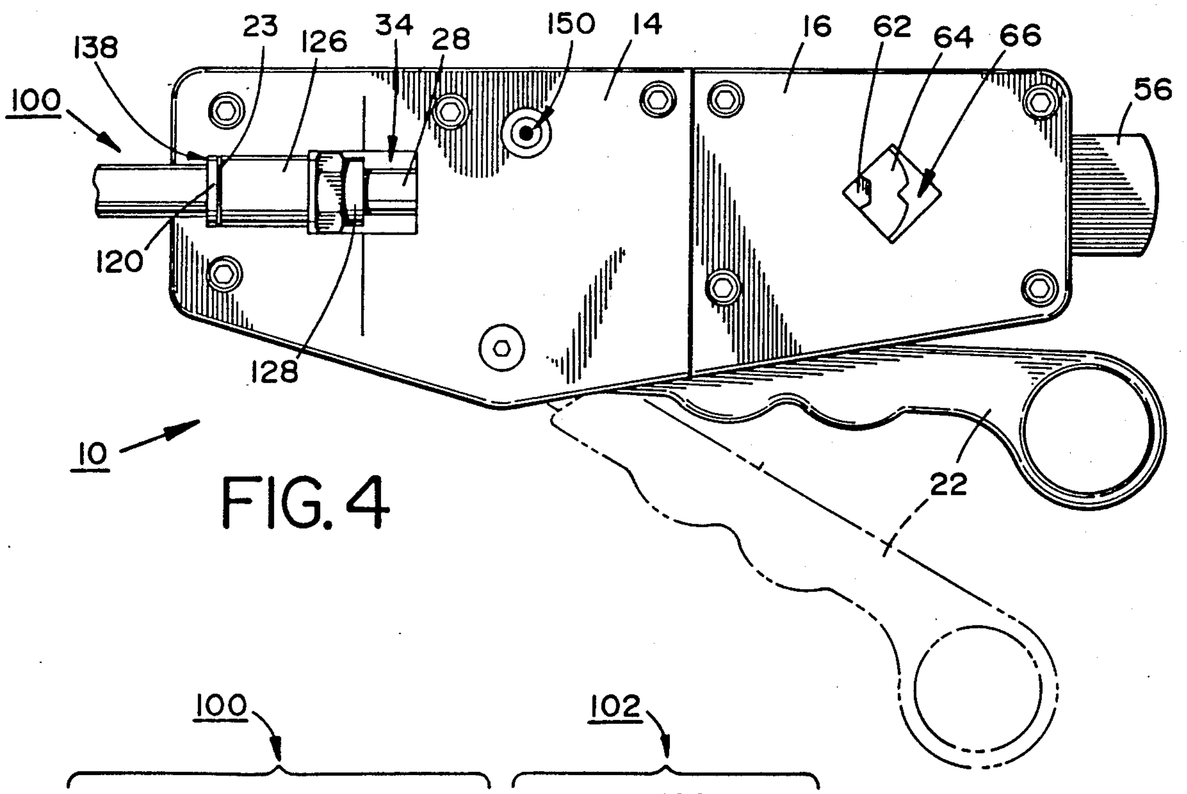
FIG. 4 is a side elevation view of the combination tool of FIG. 1 with the connector tool in its compressed position and with a coaxial cable and an end connector attached to the cable.

Referring now to the Drawing, FIGS. 1–4 illustrate a preferred embodiment of the present invention, generally indicated by the reference numeral 10, comprising a combination stripping/end connector attachment tool for coaxial cable, which includes a body 12 (FIGS. 2 and 3), and side covers 14 and 16 (FIGS. 1, 2, and 4).

Referring more particularly to FIG. 3, pivotably mounted on a shaft 18 fixed to body 12 in an actuator 20 having a handle grip lever 22 formed at its distal end and an actuating lever 24 formed at its proximal end. Actuating lever 24 contacts a flange 26 formed at the inner end of a cylindrical piston 28. In the outer end of piston 28 is defined centrally thereof and coaxially therewith a channel 30 (FIG. 2). Piston 28 is mounted in body 12 for back-and-forth axial motion relative thereto and is biased to the nonuse position shown on FIGS. 1 and 3 by means of a spring compressed between the body and flange 26. It can be seen that when handle grip lever 22 of actuator 20 is rotated upward, actuating lever 24 of the actuator will press against flange 26, causing spring 32 to be compressed, and piston 28 will move to the left. Defined within body 12 is a three-level stepped chamber 34 having a shoulder 36 defined therein, the functions of which features will be described later.

Again with particular reference to FIG. 3, also mounted within body 12 for axial back-and-forth motion relative thereto is a frame-like slide, generally indicated by the reference numeral 50, having sides 52 joining a base portion 54 at the inner end thereof and a slide extension 56 at the outer end thereof. Slide 50 is biased outward by means of a spring 58 which is compressed between the bottom surface of slide extension 56 and the upper surface of a ledge 60 formed in body 12. Mounted on a hub 62 formed on base portion 54 is a circular cutting blade 64 which protrudes (FIGS. 1 and 4) into an opening 66 defined through tool 10. A second cutting blade (not shown) is also disposed on base portion 54. In operation, which operation is described more fully in the above-referenced U.S. Pat. No. 4,805,302, slide 50 is depressed into tool 10, thus clearing cutting blade 64 from opening 66, a coaxial cable (not shown) is inserted into the opening, and the tool rotated about the cable. A coaxial cable, generally indicated by the reference numeral 100, having two-level stripping achieved by tool 10 is shown on FIG. 5.

Figure 5:
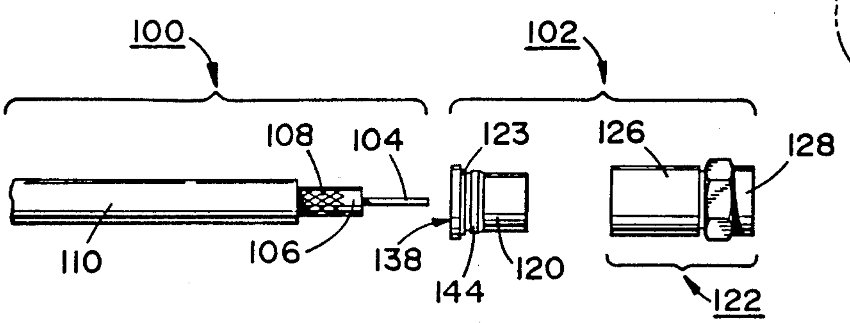
FIG. 5 is a side elevation view of a two-level-stripped coaxial cable with the two parts of a solderless, compression-fit end connector in unassembled relationship.
Figure 6:
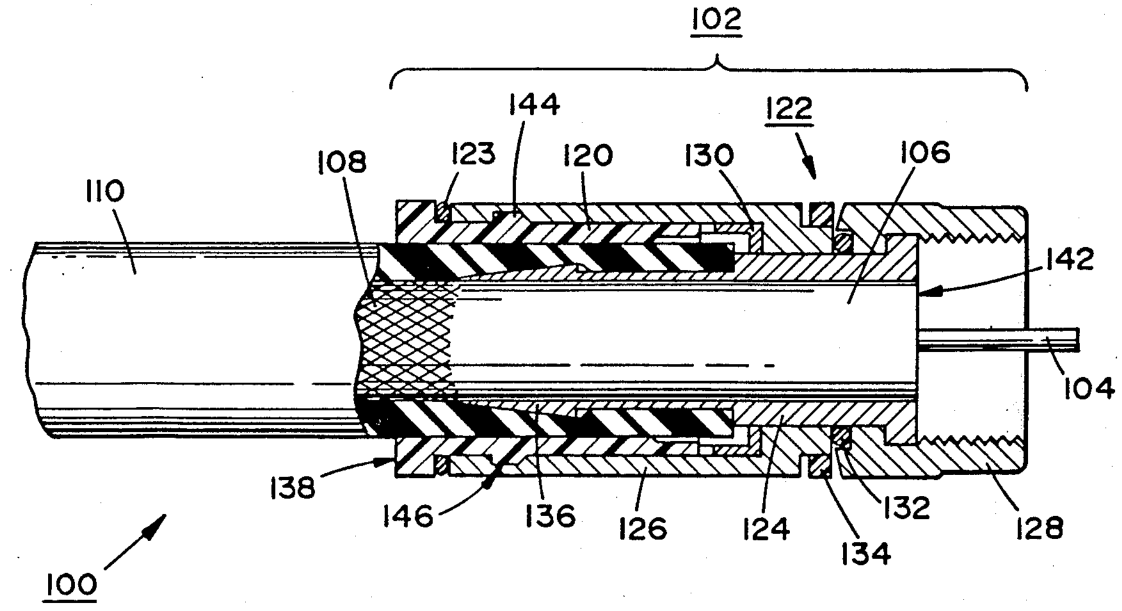
FIG. 6 is a side elevation view, partially in cross-section, of a solderless, compression-fit end connector attached to the end of a coaxial cable.

Referring now to FIGS. 5 and 6, there are shown two-level-stripped coaxial cable 100 and a two-piece, solderless, compression-fit end connector 102. Coaxial cable 100 includes a center conductor 104 covered by an inner insulation layer 106. Disposed on inner insulation layer 106 is a layer of shielding braid 108 which is covered in turn by an outer insulation layer 110.

End connector 102 includes an snap sleeve 120 having an O-ring 123, an outer assembly, generally indicated by the reference numeral 122, and an inner sleeve 124. Outer assembly includes a barrel portion 126 and a threaded female connector portion 128 rotatably secured together by means of an annular locking ring 130. Disposed between barrel portion 126 and connector portion 128 is an O-ring 132. Square ring 134 has no function as a connector element, but is provided so that snap sleeve 120 may be removably attached thereto (not shown), thus requiring the handling of only one "part."

To begin the procedure of attaching connector 102 to the end of cable 100, slide extension 56 of tool 10 is depressed to clear circular cutting blade 64 from opening 66. Cable 100 is inserted through opening 66 a selected distance and slide extension 56 is released. Tool 10 is now rotated about cable 100 which produces the stepped stripping of cable 110 shown on FIG. 5. Then, snap sleeve 120 is slipped over outer insulation layer 110 and partially inserted into barrel 126 of outer assembly 122. Since inner sleeve 124 has a wedge-shaped inner end 136, snap sleeve 120 can be inserted only so far manually. Now, the partially assembled end connector 102 is inserted into stepped chamber 34 of tool 10, with the end 138 of snap sleeve 120 abutting shoulder 36 in the stepped chamber. Then, lever 122 is manually moved to the position shown on FIG. 4, which movement causes the distal end 29 of piston 28 to bear against the end 142 of inner sleeve 124, thus driving end 136 of the inner sleeve into cable 100 (FIG. 6), with the inner sleeve under outer insulation layer 110 and in firm contact with braid 108. As can be seen on FIG. 6, snap sleeve 120 becomes "snapped" into end connector 102 by means of an annular rib 144 engaging a channel 146 defined in the inner wall of barrel portion 126 and cable 110 is captured within end connector 102 by means of the engagement of the cable by wedge-shaped end 136 and the compression of outer insulation layer 110 between the wedge-shaped end and the inner wall of barrel 126. Compression of O-ring 123 by barrel 126 completes the hermetic sealing of the internal portion of end connector 102. During the compressing operation, center conductor 104 is disposed within channel 30 in piston 28 (FIG. 2). The proper degree of compression is indicated when actuating lever 24 appears in sight hole 150 (FIG. 4).

The major elements of tool 10 are preferably of a thermoplastic material which can be conveniently and economically injection molded.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A tool for attaching a solderless, compression-fit end connector to a two-level stripped coaxial cable, said connector having a snap sleeve, an inner sleeve, and an outer assembly, comprising:

(a) a body;

(b) holding means within said body to hold said cable, said snap sleeve, said inner sleeve, and said outer assembly, said inner sleeve and said outer assembly being previously attached together, in coaxial, unattached, relationship; and (c) manually operable means to cause said snap sleeve to be driven into a portion of said outer assembly.

2. A tool, as defined in claim 1, wherein said manually operable means includes a piston disposed for axial back-and-forth motion within said body coaxially with said cable, said snap sleeve, said inner sleeve, and said outer assembly.

3. A tool, as defined in claim 2, further wherein:

(a) said holding means comprises a stepped chamber;

(b) a first end of said piston bears against said inner sleeve and moves said outer assembly over said snap ring; and (c) the force of said piston bearing against said inner sleeve is opposed by the distal end of said snap ring bearing against a shoulder defined in said chamber.

4. A tool, as defined in claim 2, wherein said manually operable means further includes:

(a) an operating lever pivotably disposed within said body so as to bear against the second end of said piston and axially move said piston; and (b) handle means fixedly attached to said operating lever so as to cause said operating lever to move when said handle means is manually moved.

5. A tool, as defined in claim 4, further comprising a sight hole defined in said body which, when said operating lever appears therein, indicates that said outer assembly has been driven over said snap ring a desired distance.

6. A tool, as defined in claim 1, further comprising cable stripping means.

7. A tool, as defined in claim 6, wherein:

(a) said holding means and said manually operable means are disposed generally at a one end of said body; and (b) said cable stripping means is disposed generally at the other end of said body.

8. A tool, as defined in claim 6, wherein said cable stripping means comprises:

(a) a first circular cutting blade disposed within said body;

(b) means to accept a cable within said body, said cable having at least one layer surrounding a central core; and (c) means to bring said circular cutting blade into cutting contact with said cable;

whereby; when said body is rotated around said cable in a plane substantially orthogonal to the axis of said cable, said first circular cutting blade will selectively cut through and sever at least one layer of said cable.

9. A tool, as defined in claim 8, further comprising:

(d) a second circular cutting blade disposed within said body to selectively cut through and sever at least one other layer of said cable.

10. A tool, as defined in claim 8, wherein said first circular cutting blade is mounted against rotation within said body, but can be manually rotated as the cutting edge of said first circular cutting blade wears.

11. A tool, as defined in claim 8, wherein said second circular cutting blade is mounted against rotation within said body, but can be manually rotated as the cutting edge of said second circular cutting blade wears.

12. A tool, as defined in claim 8, wherein said means to accept said cable comprises an aperture formed in said body.

13. A tool, as defined in claim 8, wherein said means to bring said first circular cutting blade into contact with said cable, comprises:

(a) a channel formed within said body;

(b) a slide, having a first hub at the lower end thereof for mounting said first circular cutting blade thereon and an extension at the opposite end thereof, said slide being closely and moveably held within said channel for reciprocating up-and-down motion relative to said body; and (c) means for biasing said slide upward, such that the edge of said first circular cutting blade protrudes into said aperture.

14. A tool, as defined in claim 13, further comprising:

(d) said extension extends beyond the periphery of said body; and (e) when pressure is applied to said extension to move said slide downward, said first circular cutting blade will clear said aperture to allow insertion of said cable therein.

15. A tool, as defined in claim 14, further comprising:

(f) ledge means formed on said slide;

(g) when said pressure on said extension is released to move said slide upward, said first circular cutting blade will cuttingly contact said cable; and (h) when said at least one layer of said cable has been severed, said ledge will contact the outer surface of said cable to prevent said blade from cutting through more than said at least one layer.

16. A tool, as defined in claim 8, wherein said body is formed of at least two separable parts to allow access to said first circular cutting blade.

17. A tool, as defined in claim 1, wherein the major elements thereof are formed of an injection molded thermoplastic.

* * * * *